United States Patent [19]
Volbrecht

[11] Patent Number: 4,934,831
[45] Date of Patent: Jun. 19, 1990

[54] TEMPERATURE SENSING DEVICE
[75] Inventor: Arthur O. Volbrecht, Genoa City, Wis.
[73] Assignee: Claud S. Gordon Company, Richmond, Ill.
[21] Appl. No.: 325,690
[22] Filed: Mar. 20, 1989
[51] Int. Cl.$^5$ .................. G01K 1/08; G01K 7/02; G01K 7/22
[52] U.S. Cl. .................. 374/183; 29/612; 338/22 R; 338/28; 374/163; 374/179
[58] Field of Search .............. 374/163, 179, 185, 183, 374/205; 338/22 R, 28

[56] References Cited
U.S. PATENT DOCUMENTS

| | | |
|---|---|---|
| 3,061,806 | 10/1962 | Stevens .................. 374/185 X |
| 3,158,828 | 11/1964 | Bargen .................. 338/28 |
| 3,232,794 | 2/1966 | Korton .................. 374/179 X |
| 3,281,518 | 10/1966 | Stroud et al. .................. 338/28 X |
| 3,296,572 | 1/1967 | Kleven .................. 338/28 |
| 3,723,935 | 3/1973 | Frazier et al. .................. 374/185 X |
| 3,896,409 | 7/1975 | Micheli et al. .................. 338/28 |
| 4,453,835 | 6/1984 | Clawson et al. .................. 374/208 X |
| 4,560,973 | 12/1985 | Grimm et al. .................. 374/165 X |
| 4,575,705 | 3/1986 | Gotcher .................. 374/185 X |
| 4,795,884 | 1/1989 | Carroll .................. 374/185 X |

FOREIGN PATENT DOCUMENTS
57-73640 5/1982 Japan .................. 374/144

OTHER PUBLICATIONS
Trade Literature Relating to Marshall Thermocouples, published prior to Mar. 19, 1989, Six(6) pages.

Primary Examiner—Daniel M. Yasich
Attorney, Agent, or Firm—Renner, Otto, Boisselle & Sklar

[57] ABSTRACT

A temperature sensing element (thermocouple, thermistor, or resistance temperature detector) for high temperature application is housed inside a metal tube, with lead wires to the temperature sensing element insulated from each other and the tube by a compactable mineral insulation material such as magnesium oxide. Initially the insulation material is in the form of a molded cylindrical preform with two lengthwise passages through which the lead wires are inserted. After the wires are inserted through the preform, the tube is placed around the preform and compressed to reduce its diameter. This crushes and tightly packs the insulation material around the lead wires. A strain relief and moisture seal may be provided at the end of the tube away from the temperature sensing element.

15 Claims, 2 Drawing Sheets

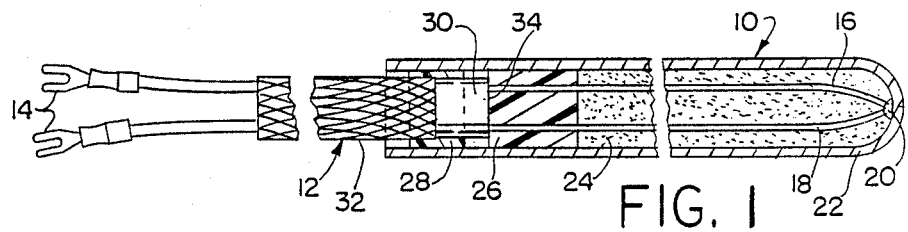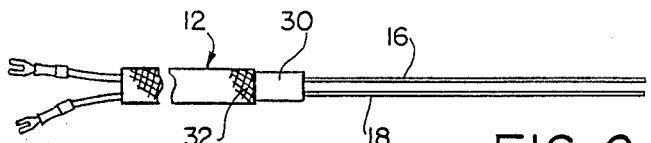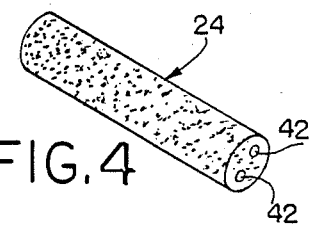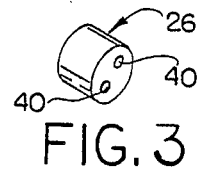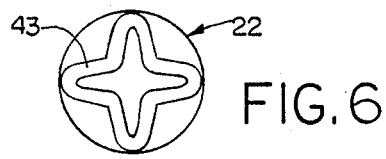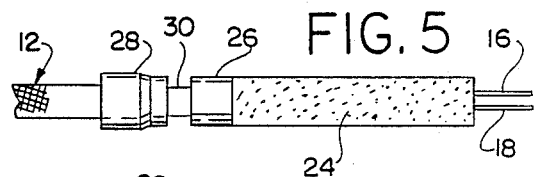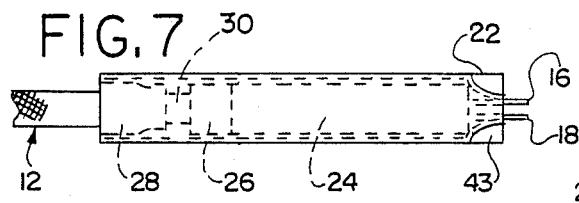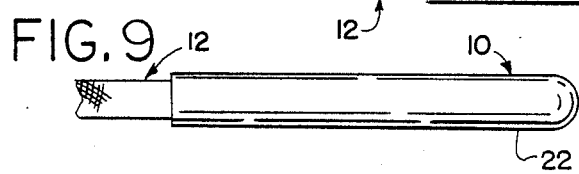

TEMPERATURE SENSING DEVICE

FIELD OF THE INVENTION

The present invention relates to temperature sensors such as thermocouples, thermistors, and resistance temperature detectors, especially those for use at relatively high temperatures.

BACKGROUND OF THE INVENTION

Prior known temperature sensors such as thermocouples have included a heavy steel tube with a pair of solid dissimilar metal wires running the length of the tube, and a hard fired ceramic insulator which separates the wires and keeps them from contacting the inside of the tube. The insulator has an outside diameter which permits it to slide easily within the metal tube and two lengthwise bores, one to accommodate each of the wires. The firing (baking) of the insulator makes the insulator hard and brittle. Also, it is known to crimp the tip of the tube onto the ends of the wires to form the thermocouple junction.

The prior art thermocouples have several drawbacks for certain uses. First, the hard fired ceramic insulator is subject to damage from vibration or impact, which may occur, for example, when these thermocouples are used to measure temperatures in foundries and other harsh work environments. In order to make the temperature sensors stronger, the walls of the metal tube which surrounds the insulator have been made thick. The tube wall thickness and the brittle insulator each make it impossible to bend the thermocouple, which may be necessary in order to measure the temperature of certain areas.

The use of solid metal wires can also be a drawback. Generally the solid wires must be connected to flexible, stranded conductors which in turn are connected to the necessary measuring junction. The connections between the solid and flexible conductors are possible points of failure in the system. For increased mechanical strength, the connections may be potted. The potting material may be the component with the lowest temperature rating of the entire sensor, and thus may limit the maximum temperature to which the sensor can be exposed safely.

SUMMARY OF THE INVENTION

It is an object of the present invention to overcome the disadvantages of the prior art by making a temperature sensor with continuous flexible lead wires having end portions which are stripped of insulation and surrounded with a crushable (compactable) mineral insulation material such as magnesium oxide. In the case of thermocouples, the lead wires are dissimilar metals and their end portions are welded together to form a hot junction. In the case of thermistors and resistance temperature detectors, an additional element is connected between the ends of the lead wires.

After the insulator is inserted over the two bare wires, a metal tube is slid over the insulator, and the tube is swaged or otherwise compressed to a reduced diameter. The compressing of the tube crushes and compacts the insulation material so that it becomes a fine, hard packed powder which completely surrounds the wires within the metal tube. The appropriate temperature sensing device is connected to the exposed wires. In the event of a thermocouple, this step encompasses welding the two wires together to form the hot junction. In the case of a resistance temperature detector or a thermistor, an additional electrical element is connected to the lead wires. Finally the end of the tube is welded closed.

Such a compacted mineral insulated temperature sensor has the advantage that it stands up very well to vibration and impact and out-performs wire-in-tube constructions by combining flexibility of the insulated wire with the rigid metal tube or sheath surrounding the hot junction. Also, a strain relief and moisture seal are desirably inserted over the wires ahead of the insulator and subsequently compressed by the tube when its diameter is reduced to prevent the tube from being pulled off the wires and keep moisture away from the sensor.

The invention, then, comprises the features hereinafter described and particularly pointed out in the claims, the following description and annexed drawings setting forth in detail certain illustrative embodiments of the invention, these being indicative of but a few of the various ways in which the principles of the invention may be embodied.

BRIEF DESCRIPTION OF THE DRAWINGS

In the annexed drawings:

FIG. 1 is a partially sectioned view of a thermocouple constructed in accordance with the present invention;

FIG. 2 shows a cable with exposed wires used in constructing the thermocouple of FIG. 1;

FIG. 3 is a perspective illustration of a moisture seal used in the thermocouple of FIG. 1;

FIG. 4 is a perspective illustration of a compactable ceramic insulator used in the thermocouple of FIG. 1;

FIG. 5 shows the cable of FIG. 2 with a strain relief, the moisture seal of FIG. 3 and the ceramic insulator of FIG. 4 assembled;

FIG. 6 is an end view of a metal tube forming a part of the thermocouple of FIG. 1 before its final shaping;

FIG. 7 illustrates the metal tube of FIG. 6 surrounding the assembly of FIG. 5;

FIG. 8 shows the tube and assembly of FIG. 7 after the tube has had its diameter reduced;

FIG. 9 shows the assembly of FIG. 8 after the end of the metal tube has been welded and shaped;

DESCRIPTION OF THE PREFERRED EMBODIMENTS

Figure 10:
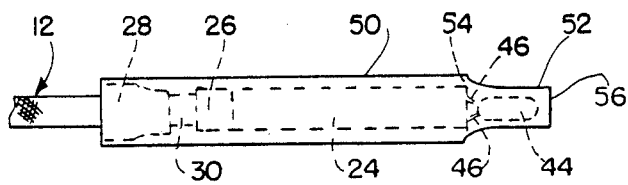
FIG. 10 illustrates another embodiment of the present invention in which a resistance temperature detector or thermistor is connected to the wires and a tube with a reduced diameter distal end is inserted over the assembly.

FIG. 1 illustrates a temperature sensing device 10 in accordance with this invention in the form of a thermocouple. The temperature sensing device 10 includes a cable 12 with cable ends 14 for connecting the temperature sensing device to an appropriate measuring junction. The cable 12 includes a pair of stranded flexible wires 16 and 18 which are made of dissimilar metals. The wires 16 and 18 are welded to each other at a hot junction 20.

The junction 20 is housed inside a metal tube 22 which protects and supports the junction 20 therewithin and facilitates attachment to a mounting surface. A mineral or ceramic insulation material 24 inside the tube 22 separates the wires and keeps the wires from contacting the tube. Preferably, the mineral or ceramic insulator material 24 is a crushed or compacted magnesium oxide which provides excellent high temperature insulating properties. A moisture seal 26 within the tube 22 adjacent the inner end thereof keeps moisture out of the tube and the insulation 24 inside the tube. A strain relief 28 at the inner end of the tube keeps lengthwise force on the cable 12 from separating the tube 22 and cable. As a result of the way the temperature sensor 10 is manufactured, the insulation 24 is a hard packed powder, and both the moisture seal 26 and strain relief 28 are tightly gripped by the inside of the tube 22.

The first step in manufacturing the temperature sensing device 10 is to strip the cable 12 as shown in FIG. 2. Each of the wires 16 and 18 inside cable 12 is separately covered with a flexible insulation, and the pair is surrounded by an additional insulation layer 30 to form the cable 12. Also, a woven stainless steel mesh 32 or the like may be provided around the outer insulation layer 30 for increased durability if desired.

In a typical application, the wires 16 and 18 may be stripped of insulation to expose approximately four inches of bare wire. Other thermocouples made according to the present invention may be substantially longer, however, and four inches is only one example. When the insulation is stripped to expose the wires 16 and 18, the stainless steel over braid 32 is also cut away to leave approximately half an inch of insulation 30 which surrounds both conductors 16 and 18. The prepared cable 12 is illustrated in FIG. 2.

After the wires 16 and 18 have been properly stripped, the strain relief 28 may be installed. The strain relief 28 may comprise a flexible plastic tube which fits snugly around the cable 12 so that part of it covers the end of the stainless steel braid 32 and part of it partially covers the exposed insulation material 30 extending outwardly beyond the stainless steel braid as schematically shown in FIG. 5.

Next, a moisture seal 26 may be placed over the two wires 16 and 18. The moisture seal 26 (shown in FIG. 3) is in the form of a short cylinder with a pair of parallel passageways 40 extending between the two annular end faces. The passageways 40 accommodate the wires 16 and 18 which pass through them. Preferably, the moisture seal 26 is formed of a material such as Teflon, polyimide or mica, which has excellent sealing properties and has a higher temperature rating than conventional potting materials.

After the moisture seal 26 is in place, the insulator 24 is placed over the two wires 16 and 18 as shown in FIG. 5. The insulator 24 has an extended cylindrical form with a pair of parallel passages 42 extending between the annular end faces of the insulator to receive the wires 16 and 18. The insulator 24 is an unfired ceramic or mineral-type insulator made, for example, of magnesium oxide which may be held together by a suitable binder. In this condition the insulator 24 is compactable and crushable. Subsequent processing squeezes the insulator material into a tightly packed, hard powder which completely fills the metal tube 22 and closely surrounds the wires 16 and 18 as described hereafter.

The next step in fabricating the temperature sensing device 10 is to prepare the metal tube 22. Initially, the metal tube is a hollow cylinder which is cut to length, and then one end is crimped half closed using, for example, a four point crimp to the quatrefoil configuration 43 shown in FIG. 6. The metal tube 22 is then placed over the previously assembled wires 16 and 18, ceramic insulator 24, moisture seal 26, and strain relief 28 as shown in FIG. 7. The half closed distal end of the tube 22 presses the insulator 24 against the moisture seal 26 and holds them in position on the cable 12 with the end portions of wires 16 and 18 sticking out of the tube 22 so that they can subsequently be welded together.

Once the metal tube 22 is in place, it is swaged or otherwise compressed to reduce its diameter and squeeze it around the components within. This causes the metal tube 22 to firmly grip the strain relief 28. At the same time, the moisture seal 26 is compressed to firmly seal around the interior surface of the metal tube 22 and likewise to form tightly around the wires 16 and 18. In addition, the swaging of the metal tube 22 crushes or compacts the ceramic insulator 24. The ceramic insulator 24 was formed to be a close sliding fit within the interior of the tube 22 prior to swaging. Swaging compacts the insulating material, causing it to completely fill the tube interior and pack tightly around the wires 16 and 18.

Once the tube 22 has been swaged in place, it is only necessary to trim the ends of the wires 16 and 18, weld them together to form the thermocouple junction 20 and weld the end of the tube 22 closed. Because the insulation material 24 becomes a tightly packed powder which completely fills the inside of the tube 22, the completed temperature sensor 10 is extremely rugged. Normal vibration has little or no effect on its operation. In addition, the stranded wires 16 and 18 can extend all the way from the thermocouple junction at the tip of tube 22 to a measuring junction 20 without there being any intervening connectors. The absence of intervening connectors means that there are fewer places for failure or high resistivity to affect temperature readings. Homogeneous wires 16 and 18 assure greater calibration accuracy by eliminating connector-to-lead wire joints. Also, transition fittings are eliminated so mounting fittings can be slipped on from either end of the assembly.

The temperature sensing device 10 may be made into a device approximately four or five inches long, but it can also readily be made into a much longer instrument. In such a longer instrument, additional advantages of the present design are apparent. The fact that the insulating material is, after compacting, finely comminuted means that the device 10 can be bent or curved to match irregular shaped surfaces without adversely affecting the insulating properties of the insulating material, since it is already finely divided. The use of stranded, flexible wires 16 and 18 also facilitates bending of the device 10. If a fired ceramic insulator were used, it would of course not be possible to bend the sensor after manufacture.

In addition to making thermocouples, the manufacturing process of the present invention may be used to make other temperature sensing devices such as thermistors or Resistance Temperature Detectors (RTD's). The manufacturing process differs from that previously described in only a few particulars. First, the wires 16 and 18 may be made of the same material rather than dissimilar metals as for a thermocouple. Also, when the cable, strain relief, moisture seal, and crushable ceramic insulator are assembled together as shown in FIG. 5, the bare ends of the wires 16 and 18 are cut off flush with the distal end face of the ceramic insulator 24. Next the sensor element 44 (either a thermistor bead or RTD depending on the device to be manufactured) is put in place. The element 44 has a pair of leads 46 (FIG. 10), and these leads are slid into the passages 42 (FIG. 4) through the ceramic insulator 24.

The metal tube 50 must take a different form to accommodate the RTD element or thermistor bead 44. To that end, an extended distal end 52 of the metal tube 50 is first swaged or otherwise compressed to a reduced inner diameter which is somewhat greater than the outer diameter of the sensor element 44 as shown in FIG. 10. The compressed distal end portion 52 of the metal tube 50 is preferably about one and one half times the length of the element 44 and has the same diameter as the intended diameter of the finished temperature sensor.

Figure 11:
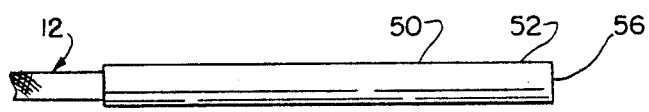
FIG. 11 shows the tube and assembly of FIG. 10 after the tube has had the remaining portion of its length reduced in diameter to that of the distal end portion.
Figure 12:
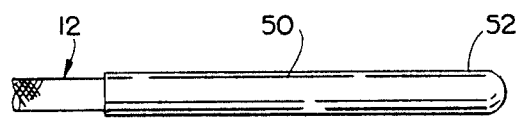
FIG. 12 shows the assembly of FIG. 11 after the end of the metal tube has been welded and shaped.

The crimped metal tube 50 is then placed over the assembly of element 44, insulator 24, moisture seal 26, strain relief 28, and cable 12. The tube is pushed on until the internal shoulder 54, where the reduced diameter distal end portion 52 of the tube 50 begins, bears against the distal end of the ceramic insulator 24 as shown in FIG. 10. Once in place, the metal tube 50 is swaged or otherwise compressed in diameter to the diameter of its reduced diameter end portion 52 as shown in FIG. 11. When compressed the tube 50 grips the strain relief 28, squeezes tightly around the moisture seal 26, and crushes and compacts the ceramic insulation 24 as before. This compression also guarantees good electrical contact between the wires 16 and 18 and the leads 46 of the temperature sensing element 44. Finally, more ceramic insulation material is introduced through the opening 56 at the reduced diameter end portion 52 of the metal tube 50 and packed around the element 44. The tube 50 is then welded closed and shaped as shown in FIG. 12.

Regardless of whether the temperature sensor of the present invention is a thermocouple, a thermistor or a resistance temperature detector, the same advantageous results are obtained. That is, because the temperature sensor is a compacted mineral insulated assembly, it stands up to vibration and outperforms wire-in-tube constructions by combining flexibility of the insulated wire with the rigid metal tube. Also, such an assembly permits the use of continuous, stranded lead wires that run from the hot junction all the way to the measuring junction. The use of homogeneous wires allows for greater calibration accuracy by eliminating connector-to-lead joints. Also, transition fittings are eliminated, whereby mounting fittings can be slipped on from either end of the assembly. Moreover, the moisture seal has a higher temperature rating than most potting materials, permitting use of the sensor in higher temperature environments. The sensor may be manufactured with either grounded or ungrounded junctions. Additionally, a spring type strain relief may be added if desired.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

What is claimed is:

1. A temperature sensing device comprising a pair of continuous flexible electrically conductive wires covered by a flexible insulation material, said wires having end portions at one end that are free of said flexible insulation material, a preformed cylindrical member made of unfired compactible mineral insulation material having a pair of parallel passages extending therethrough for receipt of said end portions of said wires, temperature sensing means at said end portions exteriorly of said preformed cylindrical member, a one-piece metal tube covering said mineral insulation material, said free end portions of said wires, and said temperature sensing means, said metal tube having an initial size to permit insertion over said preformed cylindrical member of mineral insulation material and being compressed to a smaller diameter thereby to compact said mineral insulation material tightly around said end portions of said wires, said metal tube including a closed distal end.

2. The device of claim 1 further comprising a moisture barrier surrounding said end portions of said wires between said mineral insulation material and said flexible insulation material, said metal tube overlying said moisture barrier and being compressed into sealing engagement with said moisture barrier causing said moisture barrier to form a fluid tight seal around said wires.

3. The device of claim 2 wherein said moisture barrier is made of Teflon.

4. The device of claim 2 further comprising strain relief means between said metal tube and said flexible insulation material.

5. The device of claim 4 wherein said strain relief means comprises a flexible plastic tube surrounding said flexible insulation material adjacent said end portions of said wires, said metal tube overlying said flexible plastic tube and being compressed into firm gripping engagement with said flexible plastic tube.

6. The device of claim 5 further comprising a metal overbraid surrounding said flexible insulation material, said metal overbraid being removed from said flexible insulation material adjacent said end portions of said wires, said flexible plastic tube overlying said flexible insulation material adjacent said end portions of said wires and the adjacent end of said metal overbraid, said flexible plastic tube being compressed into firm gripping engagement with said flexible insulation material and said metal overbraid by said metal tube.

7. The device of claim 1 wherein said wires are of dissimilar metals and said temperature sensing means includes means joining said end portions of said wires together.

8. The device of claim 1 wherein said temperature sensing means includes a resistance temperature detector electrically connected to said end portions of said wires.

9. The device of claim 1 wherein said temperature sensing means includes a thermistor electrically connected to said end portions of said wires.

10. The device of claim 1 wherein said wires are stranded flexible wires.

11. The device of claim 1 wherein said temperature sensing means includes a sensor element electrically connected to said end portions of said wires, and said metal tube includes an end portion surrounding said sensor element having an internal size which is less than the initial internal size of said metal tube and which is the same as the internal size of said metal tube after the remaining length of said metal tube has been compressed to a smaller diameter.

12. The device of claim 11 wherein said end portion of said metal tube has an internal shoulder which bears against an end of said preformed cylinder member prior to compressing the remaining length of said metal tube to a smaller diameter.

13. The device of claim 12 wherein said sensor element has a pair of leads that are inserted into said passages in said cylindrical member along with said end portions of said wires prior to compressing the remaining length of said metal tube to a smaller diameter, whereby during such compression, the compaction of said mineral insulation material around said wires ensures good electrical contact between said wires and said leads.

14. The device of claim 11 wherein said end portion of said metal tube is packed with additional mineral insulation material around said sensor element.

15. The device of claim 14 wherein said distal end of said metal tube is welded closed.

* * * * *

(12) EX PARTE REEXAMINATION CERTIFICATE (6856th)
United States Patent
Volbrecht

(10) Number: US 4,934,831 C1
(45) Certificate Issued: Jun. 9, 2009

(54) TEMPERATURE SENSING DEVICE

(75) Inventor: Arthur O. Volbrecht, Genoa City, WI (US)

(73) Assignee: Watlow Electric Manufacturing Company, St. Louis, MO (US)

Reexamination Request:
No. 90/008,040, Jun. 8, 2006
No. 90/008,904, Oct. 26, 2007

Reexamination Certificate for:
Patent No.: 4,934,831
Issued: Jun. 19, 1990
Appl. No.: 07/325,690
Filed: Mar. 20, 1989

(51) Int. Cl.
*G01K 1/08* (2006.01)
*G01K 7/02* (2006.01)
*G01K 7/22* (2006.01)

(52) U.S. Cl. .................. 374/183; 374/163; 374/179; 374/E7.009; 338/22 R; 338/28; 29/612

(58) Field of Classification Search .................. None
See application file for complete search history.

(56) References Cited

U.S. PATENT DOCUMENTS

| | | | |
|---|---|---|---|
| 3,061,806 A | 10/1962 | Stevens | |
| 3,492,170 A | 1/1970 | Davis et al. | |
| 3,751,305 A | 8/1973 | Huebscher | |
| 3,811,958 A | 5/1974 | Maurer | |
| 3,890,162 A | 6/1975 | Dawson | |
| 3,913,058 A | 10/1975 | Nish | |
| 3,942,242 A | 3/1976 | Rizzolo | |
| 4,137,768 A | 2/1979 | Tushie et al. | |
| 4,259,123 A | 3/1981 | Tymkewicz | |
| 4,363,556 A | 12/1982 | Belliveau et al. | |
| 4,389,876 A | 6/1983 | Szonntagh | |
| 4,417,470 A | 11/1983 | McCracken et al. | |
| 4,438,290 A | 3/1984 | Wells, Jr. et al. | |
| 4,453,835 A | 6/1984 | Clawson et al. | |
| 4,484,018 A | 11/1984 | McLynn | |
| 4,487,208 A | 12/1984 | Kamens | |
| 4,590,326 A | 5/1986 | Woldy et al. | |
| 4,602,148 A | 7/1986 | Ramsey | |
| 4,875,782 A | 10/1989 | Fox | |
| 4,929,092 A | 5/1990 | Taguchi et al. | |
| 4,937,552 A | 6/1990 | Lam | |
| 4,977,385 A | 12/1990 | McQueen | |

FOREIGN PATENT DOCUMENTS

JP 59208425 11/1984

*Primary Examiner*—Minh Nguyen

(57) ABSTRACT

A temperature sensing element (thermocouple, thermistor, or resistance temperature detector) for high temperature application is housed inside a metal tube, with lead wires to the temperature sensing element insulated from each other and the tube by a compactable mineral insulation material such as magnesium oxide. Initially the insulation material is in the form of a molded cylindrical preform with two lengthwise passages through which the lead wires are inserted. After the wires are inserted through the preform, the tube is placed around the preform and compressed to reduce its diameter. This crushes and tightly packs the insulation material around the lead wires. A strain relief and moisture seal may be provided at the end of the tube away from the temperature sensing element.

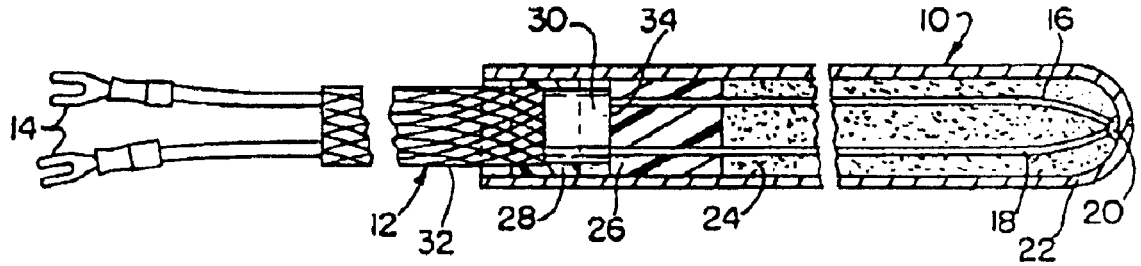

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–15 is confirmed.

* * * * *